(12) United States Patent
Weydert et al.

(10) Patent No.: US 11,834,569 B2
(45) Date of Patent: Dec. 5, 2023

(54) RUBBER COMPOSITION AND A RUBBER PRODUCT

(71) Applicants: THE GOODYEAR TIRE & RUBBER COMPANY, Akron, OH (US); LUXEMBOURG INSTITUTE OF SCIENCE AND TECHNOLOGY, Esch-sur-Alzette (LU)

(72) Inventors: Marc Weydert, Bertrange (LU); Suzanne Michelle Balko, Konz (DE); Laura Puchot, Esch-sur-Alzette (LU); Acerina Trejo Machin, Esch-sur-Alzette (LU); Pierre Verge, Esch-sur-Alzette (LU)

(73) Assignees: THE GOODYEAR TIRE & RUBBER COMPANY, Akron, OH (US); LUXEMBOURG INSTITUTE OF SCIENCE AND TECHNOLOGY (LIST), Esch-sur-Alzette (LU)

( * ) Notice: Subject to any disclaimer, the term of this patent is extended or adjusted under 35 U.S.C. 154(b) by 239 days.

(21) Appl. No.: 17/211,408

(22) Filed: Mar. 24, 2021

(65) Prior Publication Data

US 2021/0309838 A1    Oct. 7, 2021

Related U.S. Application Data

(60) Provisional application No. 63/003,513, filed on Apr. 1, 2020.

(51) Int. Cl.
| | |
|---|---|
| *C08L 19/00* | (2006.01) |
| *C08K 3/04* | (2006.01) |
| *C08K 3/06* | (2006.01) |
| *C08K 5/17* | (2006.01) |
| *C08K 5/357* | (2006.01) |
| *C08L 9/00* | (2006.01) |
| *B60C 1/00* | (2006.01) |

(52) U.S. Cl.
CPC .............. *C08L 19/00* (2013.01); *C08K 3/04* (2013.01); *C08K 3/06* (2013.01); *C08K 5/17* (2013.01); *C08K 5/357* (2013.01); *C08L 9/00* (2013.01); *B60C 1/0016* (2013.01)

(58) Field of Classification Search
CPC .. C08L 19/00; C08L 9/00; C08K 3/06; C08K 5/17; C08K 5/357
See application file for complete search history.

(56) References Cited

U.S. PATENT DOCUMENTS

| | | |
|---|---|---|
| 2018/0186976 A1 | 7/2018 | Sung et al. |
| 2020/0087268 A1 | 3/2020 | Fedurco et al. |
| 2020/0095211 A1 | 3/2020 | Fedurco et al. |
| 2020/0095458 A1 | 3/2020 | Fedurco et al. |
| 2020/0325308 A1* | 10/2020 | Frisch ................... C08L 9/00 |

FOREIGN PATENT DOCUMENTS

| | | | |
|---|---|---|---|
| CN | 107216608 A | * 9/2017 | ............ C08L 63/00 |
| CN | 107750264 A | 3/2018 | |
| CN | 10551140 A | * 12/2019 | ........... C07D 493/10 |
| JP | 2007211088 A | 8/2007 | |
| JP | 2009270016 A | 11/2009 | |
| KR | 20150017490 A | 2/2015 | |
| KR | 20150017491 A | * 2/2015 | ............... B60C 1/00 |
| KR | 20150017491 A | 2/2015 | |
| WO | 2018219882 A1 | 12/2018 | |
| WO | 2018229415 A1 | 12/2018 | |
| WO | WO2019086798 A | * 5/2019 | ............... B60C 1/00 |

OTHER PUBLICATIONS

KR20150017491A English Translation (Year: 2015).*
CN107216608A ENglish Translation (Year: 2017).*
CN110551140A English Translation (Year: 2019).*
European Search Report dated Sep. 8, 2021 for European Patent Application No. EP21164420 which is the European counterpart to the subject patent application.
Chinese Office Action dated Nov. 1, 2022 for Chinese Patent Application No. 202110355034.2 which is the Chinese counterpart to the subject patent application.
Schwartz et al. "Combination of rubber, plastics and synthetic resin". Petroleum Chemical Press, p. 183, Dec. 31, 1976.

* cited by examiner

*Primary Examiner* — Ling Siu Choi
*Assistant Examiner* — Huihong Qiao
(74) *Attorney, Agent, or Firm* — Alvin T. Rockhill

(57) ABSTRACT

The present invention is directed to a rubber composition comprising 100 phr of one or more diene-based elastomers, 30 phr to 200 phr of a filler, and a benzoxazine which is the reaction of (i) a diphenol comprising two phenol groups and a bridge covalently connecting the two phenol groups, (ii) an aldehyde derivative, and (iii) an amine, wherein the bridge is connected to at least one of the phenol groups at a meta position of said at least one phenol group. The present invention is also directed to a rubber product comprising such a rubber composition and the use of such rubber products in tire components.

11 Claims, 1 Drawing Sheet

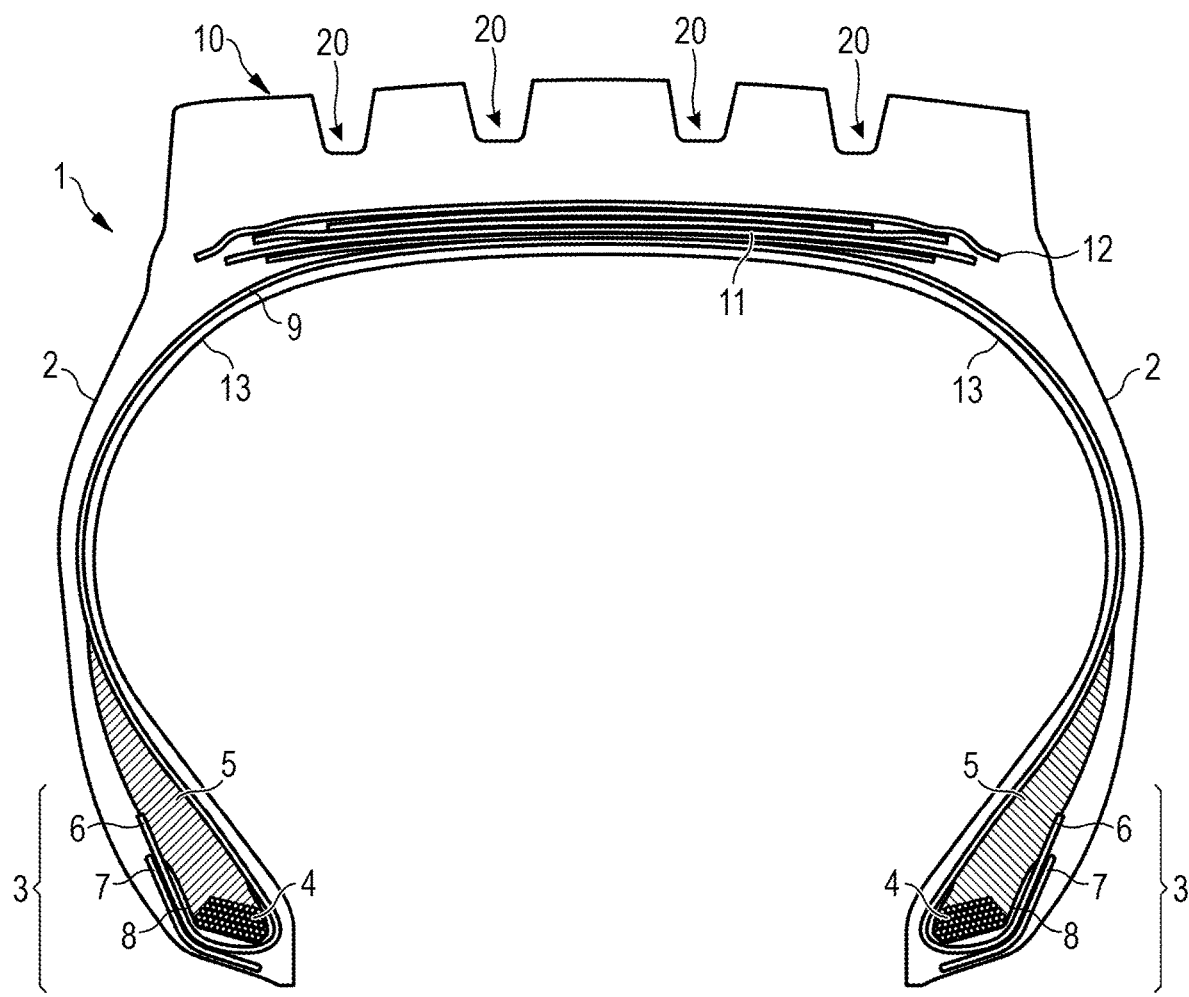

RUBBER COMPOSITION AND A RUBBER PRODUCT

This application claims benefit of U.S. Provisional Patent Application Ser. No. 63/003,513, filed on Apr. 1, 2020. The teachings of United States Provisional Patent Application Ser. No. 63/003,513 are incorporated herein by reference in their entirety.

FIELD OF THE INVENTION

The present invention relates to a rubber composition, including non-vulcanized (uncured) rubber compositions, for utilization in rubber products, such as tires and tire components.

BACKGROUND OF THE INVENTION

The use of reinforcing resins has helped to further improve tire performance over the past decades. In particular, reactive resin systems based on a methylene donor and a methylene acceptor, also known as Novolak resins, which are reacted in situ while mixing the rubber composition, have been used to boost properties in different rubber compositions. However, use of such resins requires handling of methylene donors, also called formaldehyde donors, and resorcinol in the rubber mixing process which can be undesirable from an environment, health and/or safety perspective. Moreover, there has been a demand for further improvements in reinforcement properties, in particular at limited weight and hysteresis. Thus, significant room for improvement is left in the field of reinforcing resins for rubber compositions, in particular for the use in tires.

SUMMARY OF THE INVENTION

One object of the present invention may be to provide an advanced rubber composition having improved reinforcement properties.

Another object of the present invention may be to provide a rubber composition having good stiffness properties, optionally at limited hysteresis.

Another object of the invention may be to provide a rubber composition allowing for a reduction of methylene donors handled during manufacturing of the rubber composition.

Another object of the invention may be to provide cost-efficient alternatives for existing reactive resin systems.

The scope of protection of the present invention is defined by independent claim 1, further preferred embodiments are recited in the dependent claims and the aspects and embodiments provided in the summary and description herein below.

Thus, in a first aspect of the invention, the present invention is directed to a rubber composition comprising 100 phr of one or more, preferably diene-based, elastomers, 30 to 200 phr of a filler, and a benzoxazine which is the reaction product of (i) a diphenol comprising two phenol groups and a bridge covalently connecting or interconnecting the two phenol groups, (ii) an aldehyde derivative, and (iii) an amine, wherein the bridge is connected to at least one of the phenol groups at a (respective) meta position of said at least one phenol group. The inventors have found that the use of such a benzoxazine provides superior reinforcement properties. Moreover, such a benzoxazine can be pre-manufactured and then added to a rubber composition, thus omitting the need to handle reactive resin reactants during rubber composition production. Furthermore, it has been found that the provision of benzoxazines based on diphenols bridged at at least one meta position of one of the phenol groups provides improved reinforcing properties over other configurations as para and ortho positions are not blocked and available for cross linking in the rubber network.

In another embodiment, the amine is a primary amine (i.e. a molecule having an amino group).

In another embodiment, the aldehyde derivative is selected from a group of: formaldehyde, paraformaldehyde, polyoxymethylene, and aldehydes having the formula RCHO, wherein R is a substituted or unsubstituted aliphatic $C_1$-$C_{20}$ alkyl group with or without heteroatoms. In particular, the reaction may take place in the presence of formaldehyde. Even if formaldehyde is participating in the reaction to form the benzoxazine such a reaction does not take place when making the rubber composition but premanufactured benzoxazine may be added to the rubber composition.

In yet another embodiment, the amine or primary amine is selected from the group of: aromatic amines, aliphatic amines, cycloaliphatic amines, and heterocyclic amines.

In still another embodiment, the amine or primary amine is selected from the group of ethanolamine, allylamine, methylamine, ethylamine, propylamine, butylamine, isopropylamine, hexylamine, cyclohexylamine, 2-aminofluorene, aminophenyl acetylene, propargyl ether aniline, 4-aminobenzonitrile, furfurylamine, aniline.

In still another embodiment, and in case of aliphatic amines, the aliphatic amine comprises a carbon chain of less than 18 carbon atoms. In particular, it has turned out that longer chains impair cross linking in the rubber network.

In still another embodiment, the bridge comprises one of an aromatic group, an aliphatic group, a cycloaliphatic group, a heterocyclic group, a hexafluoropropane group, a monosulfide, an oxygen group, a sulfone group, and a disulfide. In particular, disulfide groups or bridges are of high interest in sulfur vulcanizable rubbers or, in other words, in sulfur cross-linkable rubbers, as they add another valuable side for cross linking.

In one embodiment, the diphenol is selected from 3,4'-dihydroxydiphenyl disulfide and 3,3'-dihydroxydiphenyl disulfide. These diphenols have been identified to offer good reinforcement properties at limited costs.

In still another embodiment, the benzoxazine has at least one of the following structures:

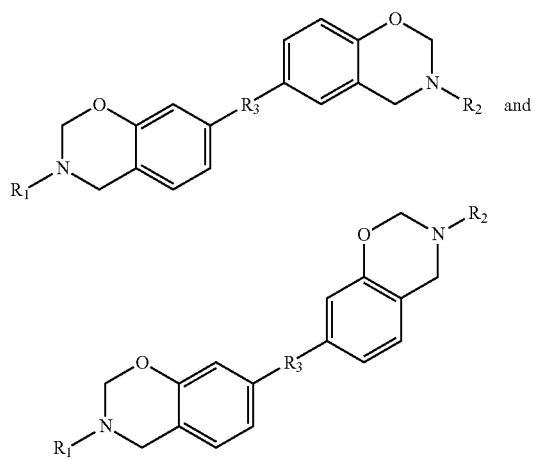

wherein $R_1$ and $R_2$ are selected from aromatic groups, aliphatic groups, cycloaliphatic groups and heterocyclic groups, and wherein $R_3$ is an aromatic group, aliphatic group, cycloaliphatic group, heterocyclic group, hexafluoropropane, a monosulfide (S), or a disulfide (S—S). As visible in the above structural drawings, ortho and para positions are available, where $R_3$ is bound in meta position. This improves further the crosslinking in the rubber network.

In still another embodiment, $R_1$ and $R_2$ are selected from ethanol, allyl, methyl, ethyl, propyl, isopropyl, hexyl, cyclohexyl, fluorene, phenyl acetylene, propargyl ether benzyl, benzonitrile, furfuryl, and benzyl groups.

In still another embodiment, $R_3$ is disulfide (S—S).

In still another embodiment, the rubber composition is a sulfur vulcanizable rubber composition comprising a sulfur donor.

In still another embodiment, the rubber composition is a (sulfur) vulcanized rubber composition.

In still another embodiment, the filler comprises one or more of silica, carbon black, aluminum hydroxide, ultra-high molecular weight polyethylene, and syndiotactic polybutadiene. Preferably, at least 50 phr of the filler comprise carbon black and/or silica.

In still another embodiment, the rubber composition is a sulfur vulcanizable (i.e. non-vulcanized or uncured) rubber composition comprising less than 2 phr, preferably less than 1 phr, even more preferably less than 0.5 phr of a methylene donor and/or less than 5 phr of a methylene acceptor (such as present in a reactive resin system).

In still another embodiment, the rubber composition comprises a further benzoxazine based on the reaction of a phenol and a primary amine. For instance, the further or second benzoxazine may be one or more of a monofunctional benzoxazine and a main-chain benzoxazine. In particular, such second benzoxazines bearing at least one functional group (e.g. bearing a silane, a long alkyl chain or a carboxlic acid) may provide an additional function and may be integrated in the benzoxazine network after the curing step. They may further help to improve processability, reinforcement and/or hysteresis, and/or improve interaction with fillers, rubber and/or the curing package.

In still another embodiment, the rubber composition comprises 5 phr to 40 phr, or 5 phr to 9 phr, or 10 phr to 20 phr, or 20 phr to 40 phr, or 10 phr to 40 phr of the benzoxazine.

In an embodiment, the rubber composition may include at least one and/or one additional diene-based rubber. Representative synthetic polymers may be the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter may be acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g. acrolein, methyl isopropenyl ketone and vinylethyl ether. Specific examples of synthetic rubbers include neoprene (polychloroprene), polybutadiene (including cis 1,4-polybutadiene), polyisoprene (including cis 1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. Preferred rubber or elastomers may be in general natural rubber, synthetic polyisoprene, polybutadiene and SBR including SSBR.

In another embodiment, the composition may comprise at least two diene-based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers, and emulsion polymerization prepared butadiene/acrylonitrile copolymers.

In another embodiment, an emulsion polymerization derived styrene/butadiene (ESBR) might be used having a styrene content of 20 to 28 percent bound styrene or, for some applications, an ESBR having a medium to relatively high bound styrene content, namely a bound styrene content of 30 to 45 percent. In many cases, the ESBR will have a bound styrene content which is within the range of 26 percent to 31 percent. By emulsion polymerization prepared ESBR, it may be meant that styrene and 1,3-butadiene are copolymerized as an aqueous emulsion. Such are well known to those skilled in such art. The bound styrene content can vary, for example, from 5 to 50 percent. In one aspect, the ESBR may also contain acrylonitrile to form a terpolymer rubber, as ESBAR, in amounts, for example, of 2 to 30 weight percent bound acrylonitrile in the terpolymer. Emulsion polymerization prepared styrene/butadiene/acrylonitrile copolymer rubbers containing 2 to 40 weight percent bound acrylonitrile in the copolymer may also be contemplated as diene-based rubbers.

In another embodiment, solution polymerization prepared SBR (SSBR) may be used. Such an SSBR may for instance have a bound styrene content in a range of 5 to 50 percent, preferably 9 to 36, percent, and most preferably 26 to 31 percent. The SSBR can be conveniently prepared, for example, by anionic polymerization in an inert organic solvent. More specifically, the SSBR can be synthesized by copolymerizing styrene and 1,3-butadiene monomer in a hydrocarbon solvent utilizing an organo lithium compound as the initiator. In still another embodiment, the solution styrene butadiene rubber is a tin-coupled polymer. In still another embodiment, the SSBR is functionalized for improved compatibility with silica. In addition, or alternatively, the SSBR is thio-functionalized. This helps to improve stiffness of the compound and/or its hysteresis behavior. Thus, for instance, the SSBR may be a thio-functionalized, tin-coupled solution polymerized copolymer of butadiene and styrene.

In one embodiment, a synthetic or natural polyisoprene rubber may be used. Synthetic cis-1,4-polyisoprene and natural rubber are as such well known to those having skill in the rubber art. In particular, the cis 1,4-microstructure content may be at least 90% and is typically at least 95% or even higher.

In one embodiment, cis-1,4-polybutadiene rubber (BR or PBD) is used. Suitable polybutadiene rubbers may be prepared, for example, by organic solution polymerization of 1,3-butadiene. The BR may be conveniently characterized, for example, by having at least a 90 percent cis-1,4-microstructure content ("high cis" content) and a glass transition temperature (Tg) in a range of from −95° C. to −110° C. Suitable polybutadiene rubbers are available commercially, such as Budene® 1207, Budene® 1208, Budene® 1223, or Budene® 1280 from The Goodyear Tire & Rubber Company. These high cis-1,4-polybutadiene rubbers can for instance be synthesized utilizing nickel catalyst systems which include a mixture of (1) an organonickel compound, (2) an organoaluminum compound, and (3) a fluorine containing compound as described in U.S. Pat. Nos. 5,698,643 and 5,451,646, which are incorporated herein by reference.

A glass transition temperature (Tg) of an elastomer or elastomer composition, where referred to herein, represents the glass transition temperature(s) of the respective elastomer or elastomer composition in its uncured state or possibly a cured state in the case of an elastomer composition. A Tg can be suitably determined as a peak midpoint by a differential scanning calorimeter (DSC) at a temperature rate of increase of 10° C. per minute, according to ASTM D3418.

The term "phr" as used herein, and according to conventional practice, refers to "parts by weight of a respective material per 100 parts by weight of rubber, or elastomer". In general, using this convention, a rubber composition is comprised of 100 parts by weight of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 phr to 10 phr, optionally from 1 to 5 phr, of one or more additional diene-based rubbers, such as SBR, SSBR, ESBR, PBD/BR, NR and/or synthetic polyisoprene. In another example, the composition may include less than 5 phr, preferably less than 3 phr, of an additional diene-based rubber or be also essentially free of such an additional diene-based rubber. The terms "compound" and "composition" and "formulation" may be used herein interchangeably, unless indicated otherwise.

In an embodiment, the rubber composition may also include oil, in particular processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils may include various oils as are known in the art, including aromatic, paraffinic, naphthenic, vegetable oils, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Some representative examples of vegetable oils that can be used include soybean oil, sunflower oil, canola (rapeseed) oil, corn oil, coconut oil, cottonseed oil, olive oil, palm oil, peanut oil, and safflower oil. Soybean oil and corn oil are typically preferred vegetable oils. If used, the rubber composition may also include up to 70 phr of processing oil, preferably between 5 and 25 phr, or alternatively less than 10 phr oil, and preferably less than 5 phr of oil.

In an embodiment, the rubber composition may include silica. Commonly employed siliceous pigments which may be used in the rubber compound include for instance conventional pyrogenic and precipitated siliceous pigments (silica). In one embodiment, precipitated silica is used. The conventional siliceous pigments may be precipitated silicas such as, for example, those obtained by the acidification of a soluble silicate, e.g. sodium silicate. Such conventional silicas might be characterized, for example, by having a BET surface area, as measured using nitrogen gas. In one embodiment, the BET surface area may be in the range of 40 to 600 square meters per gram. In another embodiment, the BET surface area may be in a range of 50 to 300 square meters per gram. The BET surface area can be suitably determined according to ASTM D6556 or equivalent and is described in the Journal of the American Chemical Society, Volume 60, Page 304 (1930). The conventional silica may also be characterized by having a dibutylphthalate (DBP) absorption value in a range of 100 $cm^3/100$ g to 400 $cm^3/100$ g, alternatively 150 $cm^3/100$ g to 300 $cm^3/100$ g, which can be suitably determined according to ASTM D 2414 or equivalent. A conventional silica might be expected to have an average ultimate particle size, for example, in the range of 0.01 to 0.05 micron as determined by the electron microscope, although the silica particles may be even smaller, or possibly larger, in size. Ranges of silica use could be for instance between 5 and 120 phr, preferably between 20 and 70 phr or 80 to 120 phr. Various commercially available silicas may be used, such as, only for example herein, and without limitation, silicas commercially available from PPG Industries under the Hi-Sil trademark with designations 210, 315G, EZ160G, etc; silicas available from Solvay, with, for example, designations of Z1165MP and Premium200MP, etc. and silicas available from Evonik AG with, for example, designations VN2 and Ultrasil 6000GR, 9100GR, etc.

In still another embodiment, the rubber composition may comprise pre-silanized and precipitated silica which may for instance have a CTAB adsorption surface area of between 130 $m^2/g$ and 210 $m^2/g$, optionally between 130 $m^2/g$ and 150 $m^2/g$ and/or between 190 $m^2/g$ and 210 $m^2/g$, or even between 195 $m^2/g$ and 205 $m^2/g$. The CTAB (cetyl trimethyl ammonium bromide) method for determination of the silica surface area (ASTM D6845) is known to the person skilled in the art.

In another embodiment, pre-silanized, or in other words pre-hydrophobated, precipitated silica utilized is hydrophobated prior to its addition to the rubber composition by treatment with at least one silane. Suitable silanes include but are not limited to alkylsilanes, alkoxysilanes, organoalkoxysilyl polysulfides and organomercaptoalkoxysilanes.

Optional silica dispersing aids, if used, are present in an amount ranging from about 0.1% to about 25% by weight based on the weight of the silica, with about 0.5% to about 20% by weight being suitable, and about 1% to about 15% by weight based on the weight of the silica also being suitable. Various pre-treated precipitated silicas are described in U.S. Pat. Nos. 4,704,414, 6,123,762 and 6,573, 324. The teachings of U.S. Pat. Nos. 4,704,414, 6,123,762 and 6,573,324 are incorporated herein by reference.

Some non-limiting examples of pre-treated silicas (i.e., silicas that have been pre-surface treated with a silane) which are suitable for use in the practice of this invention include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica, and Coupsil® 6508, Agilon® 400 silica from PPG Industries, Agilon® 454 silica from PPG Industries, and Agilon® 458 silica from PPG Industries. Some representative examples of preferred pre-silanized precipitated silicas include Agilon® 400, Agilon® 454 and Agilon® 458 from PPG Industries.

A representative silica coupler (silica coupling agent) having a moiety reactive with hydroxyl groups on pre-silanized precipitated silica and on precipitated silica and another moiety interactive with said elastomers, may be comprised of, for example:
  (A) bis(3-trialkoxysilylalkyl) polysulfide containing an average in the range of from about 2 to about 4, alternatively from about 2 to about 2.6 or from about 3.2 to about 3.8, sulfur atoms in its connecting bridge, or (B) an alkoxyorganomercaptosilane, or (C) their combination. Representative of such bis(3-trialkoxysilylalkyl) polysulfide is bis(3-triethoxysilylpropyl) polysulfide. As indicated, for the pre-silanized precipitated silica, the silica coupler may be desirably an alkoxyorganomercaptosilane. For the non-pre-silanized precipitated silica, the silica coupler may be desirably comprised of the bis(3-triethoxysilylpropyl) polysulfide.

In one embodiment, the rubber composition is exclusive of addition of silica coupler to the rubber composition (thereby exclusive of silica coupler).

As indicated, in one embodiment, the rubber composition may contain a combination of additional silica coupler added to the rubber composition, particularly a bis(3-triethoxysilylpropyl) polysulfide containing an average of from about 2 to about 4 connecting sulfur atoms in its polysulfidic bridge together with an additional precipitated silica (non-pre-silanized precipitated silica) added to said rubber composition, wherein the ratio of pre-silanized precipitated silica to said precipitated silica is desirably at least 8/1, alternately at least 10/1.

In an embodiment, the rubber composition may include carbon black. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades. These carbon blacks have iodine absorptions ranging from 9 to 145 g/kg and a DBP number ranging from 34 to 150 cm$^3$/100 g. Iodine absorption values can be suitably determined according to ASTM D1510 or equivalent. Commonly employed carbon blacks can be used as a conventional filler in an amount ranging from 10 to 150 phr. In another embodiment, from 20 to 80 phr of carbon black may be used.

In another embodiment, other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534, 6,207,757, 6,133,364, 6,372,857, 5,395,891, or U.S. Pat. No. 6,127,488, and a plasticized starch composite filler including but not limited to that disclosed in U.S. Pat. No. 5,672,639. The teaching of U.S. Pat. Nos. 6,242,534, 6,207,757, 6,133,364, 6,372,857, 5,395,891, 6,127,488, and 5,672,639 are incorporated hereby reference. Such other fillers may be used in an amount ranging from 1 phr to 30 phr.

In one embodiment, the rubber composition may contain a conventional sulfur containing organosilicon compound or silane. Examples of suitable sulfur containing organosilicon compounds are of the formula:

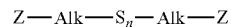

in which Z is selected from the group consisting of

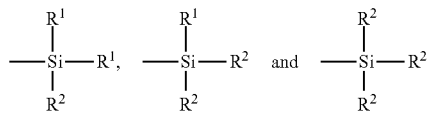

where $R^1$ is an alkyl group of 1 to 4 carbon atoms, cyclohexyl or phenyl; $R^2$ is an alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

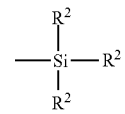

where $R^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4. In another embodiment, suitable sulfur containing organosilicon compounds include compounds disclosed in U.S. Pat. No. 6,608,125.

In one embodiment, the sulfur containing organosilicon compounds includes 3-(octanoylthio)-1-propyltriethoxysilane, $CH_3(CH_2)_6C(=O)—S—CH_2CH_2CH_2Si(OCH_2CH_3)_3$, which is available commercially as NXT™ from Momentive Performance Materials. In another embodiment, suitable sulfur containing organosilicon compounds include those disclosed in United States Patent Application Publication No. 2003/0130535. In one embodiment, the sulfur containing organosilicon compound is Si-363 from Degussa. The amount of the sulfur containing organosilicon compound in a rubber composition may vary depending on the level of other additives that are used. Generally speaking, the amount of the compound may range from 0.5 phr to 20 phr. In one embodiment, the amount will range from 1 phr to 10 phr.

In another embodiment, the rubber composition comprises less than 0.1 phr cobalt salt or 0 phr cobalt salt.

It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Some representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may for instance be used in an amount ranging from 0.5 phr to 8 phr, alternatively with a range of from 1.5 phr to 6 phr. Typical amounts of tackifier resins, if used, comprise for example 0.5 phr to 10 phr, usually 1 phr to 5 phr. Typical amounts of processing aids, if used, comprise for example 1 phr to 50 phr (this may comprise in particular oil). Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3 phr. Typical amounts of waxes, if used, may for example comprise 1 phr to 5 phr. Often microcrystalline waxes are used. Typical amounts of peptizers, if used, may for instance comprise 0.1 phr to 1 phr. Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate. In one embodiment, a single accelerator system may be used, i.e. primary accelerator. The primary accelerator(s) may be used in total amounts ranging from 0.5 phr to 4 phr, alternatively 0.8 phr to 1.5 phr. In another embodiment, combinations of a primary and a secondary accelerator might be used with the secondary accelerator being used in smaller amounts, such as from 0.05 phr to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are for instance amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be for instance a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely, at least one nonproductive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) of the preceding nonproductive mix stage(s). The terms "nonproductive" and "productive" mix stages are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature which is within the range of 140° C. and 190° C. The appropriate duration of the thermomechanical working varies as a function of the operating conditions, and the volume and nature of the components. For example, the thermomechanical working may be from 1 to 20 minutes.

Vulcanization of the pneumatic tire of the present invention may for instance be carried out at conventional temperatures ranging from 100° C. to 200° C. In one embodiment, the vulcanization is conducted at temperatures ranging from 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

In a second aspect, the present invention is directed to a rubber composition comprising 100 phr of one or more, preferably diene-based, elastomers, 30 phr to 200 phr of a filler, and a benzoxazine having at least one of the following structures:

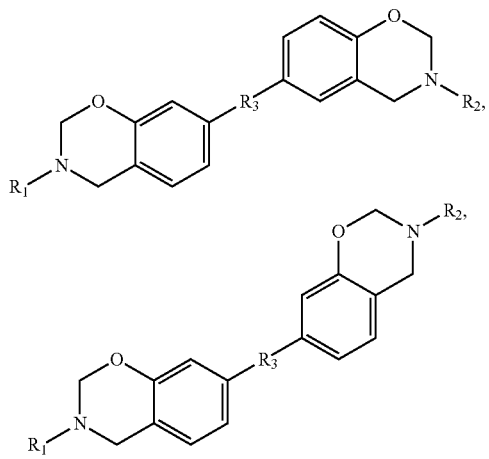

wherein $R_1$ and $R_2$ are selected from aromatic groups, aliphatic groups, cycloaliphatic groups and heterocyclic groups, and wherein $R_3$ is an aromatic group, aliphatic group, cycloaliphatic group, heterocyclic group, hexafluoropropane, monosulfide, or disulfide.

The second aspect and also other aspects mentioned herein may be combined with the embodiments mentioned in the context of other aspects, in particular the first aspect of the invention.

In a third aspect of the present invention, a rubber product is provided, the rubber product comprising the rubber composition according to the above first aspect or in accordance with one or more of its embodiments.

In one embodiment, the rubber product is selected from a tire, a power transmission belt, a hose, a track, an air sleeve, and a conveyor belt. The tire can for instance be a pneumatic or a non-pneumatic tire.

In a further embodiment, the rubber product is a tire, comprising one or more rubber components selected from a tread, a rubber shearband, rubber spokes, an undertread, a sidewall, an apex, a flipper, a chipper, a chafer, a carcass, a belt, an overlay, wherein one or more of the rubber components comprising the rubber composition.

In another embodiment, the rubber product is a tire comprising an apex or a tread groove reinforcement comprising the rubber composition. In particular, apex compositions or tread groove reinforcement compositions may benefit from the reinforcement properties of the rubber compositions disclosed herein.

A tire according to an embodiment of the invention may for example be a pneumatic tire or nonpneumatic tire, a race tire, a passenger tire, an aircraft tire, an agricultural tire, an earthmover tire, an off-the-road (OTR) tire, a truck tire or a motorcycle tire. The tire may also be a radial or bias tire.

In a fourth aspect, the present invention is directed to a method of making a rubber composition comprising one or more of the following steps:
- A. Reacting, in a first step, (or in other words pre-reacting) a diphenol with an amine, in particular a primary amine, in the presence of an aldehyde derivative (preferably formaldehyde) to obtain a benzoxazine, wherein the diphenol comprises a bridge linking or connecting both phenol groups of the diphenol, and wherein said bridge is connected at at least one of its respective ends to a meta position of the respective phenol group;
- B. Mixing an elastomer and a filler in a second step;
- C. Adding the benzoxazine in a third step (including the option that the mixing of step B continues while adding the benzoxazine in step C);
- D. Curing the rubber composition.

Further steps may be added between the above mentioned steps.

The features of the above aspects and/or embodiments may be combined with one another other.

BRIEF DESCRIPTION OF THE DRAWINGS

The structure, operation, and advantages of the invention will become more apparent upon contemplation of the following description taken in conjunction with the accompanying drawings, wherein FIG. 1 is a schematic cross section of a tire comprising a rubber component with the rubber composition in accordance with an embodiment of the present invention.

DETAILED DESCRIPTION OF THE INVENTION

FIG. 1 is a schematic cross-section of a tire 1 according to an embodiment of the invention. The tire 1 has a plurality of tire components such as a tread 10, an innerliner 13, a belt comprising four belt plies 11, a carcass ply 9, two sidewalls 2, and two bead regions 3, bead filler apexes 5 and beads 4. The example tire 1 is suitable, for example, for mounting on a rim of a vehicle, e.g. a truck or a passenger car. As shown in FIG. 1, the belt plies 11 may be covered by an overlay ply 12 and/or may include one or more breaker plies. The carcass ply 9 includes a pair of axially opposite end portions 6, each of which is associated with a respective one of the beads 4. Each axial end portion 6 of the carcass ply 9 may be turned up and around the respective bead 4 to a position to anchor each axial end portion 6. The turned-up portions 6 of the carcass ply 9 may engage the axial outer surfaces of two flippers 8 and axial inner surfaces of two chippers 7 which are also considered as tire components. As shown in FIG. 1, the example tread 10 may have circumferential grooves 20, each groove 20 essentially defining a U-shaped opening in the tread 10. The main portion of the tread 10 may be formed of one or more tread compounds. Moreover, the grooves 20, in particular the bottoms and/or sidewalls of the grooves 20 could be reinforced by a rubber compound having a higher hardness and/or stiffness than the remaining tread compound. Such a reinforcement may be referred to herein as a groove reinforcement.

While the embodiment of FIG. 1 suggests a plurality of tire components including for instance apexes 5, chippers 7, flippers 8 and overlay 12, such and further components are not mandatory for the invention. Also, the turned-up end of the carcass ply 9 is not necessary for the invention or may pass on the opposite side of the bead area 3 and end on the axially inner side of the bead 4 instead of the axially outer side of the bead 4. The tire could also have for instance a different number of grooves 20, e.g. less than four grooves. One or more of the above tire components are made of a rubber composition in accordance with an embodiment of the present invention which comprises a benzoxazine which is the reaction product of (i) a diphenol comprising two phenol groups and a bridge covalently connecting the two phenol groups, (ii) an aldehyde derivative, and (iii) an amine, wherein the bridge is connected to at least one of the phenol groups at a meta position of said at least one phenol group.

In a first embodiment, such a rubber composition can comprise 3,3'-dihydroxy diphenyl disulfide-furfuryl amine having the following structure:

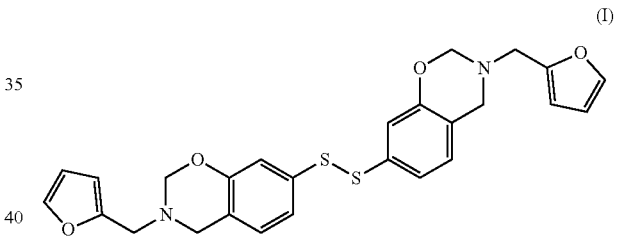

(I)

In this molecule according to structure (I), a disulfide bridge is linking both phenyl groups at a meta position, leaving the respective para positions free.

In another preferred embodiment, the benzoxazine is 3,3'-dihydroxydiphenyl disulfide ethanol amine is as shown in below structure II:

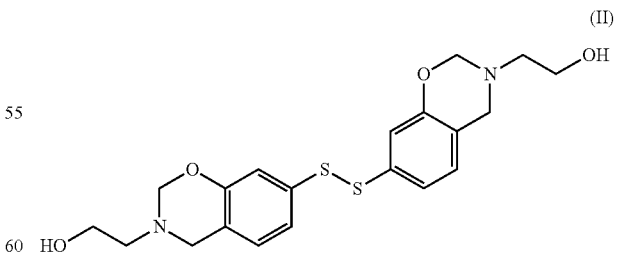

(II)

In structure II, the sulfur bridge is connected to the phenyl groups at the meta position as well.

In yet another embodiment, the benzoxazine is 3,3'-dihydroxydiphenyl disulfide aniline, as shown in below structure III:

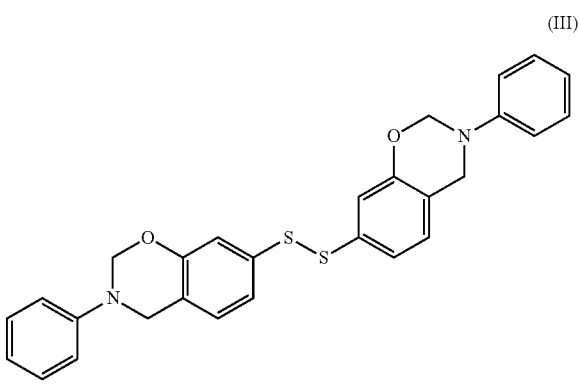 [SMILES: c1ccc(N2COc3cc(SSc4ccc5c(c4)OCN(c4ccccc4)C5)ccc3C2)cc1]

(III)

Multiple tests of the inventors have shown that 4,4'-benzoxazine configurations, providing the bridge at the para position of the phenyl groups, result in a weaker reinforcement than in the case of linking the bridge to at least one of the phenyl groups in meta position.

For instance, the inventors have also tested below structures (IV), (V) which are not in accordance with the present invention.

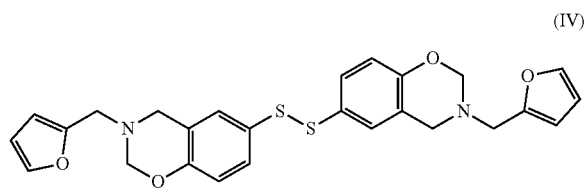 [SMILES: c1coc(CN2COc3ccc(SSc4ccc5c(c4)CN(Cc4ccco4)CO5)cc3C2)c1]

(IV)

Structure IV, not in accordance with the present invention, represents Bis (4-hydroxyphenyl disulfide furfuryl amine), in which a disulfide bridges both phenyl groups in para position.

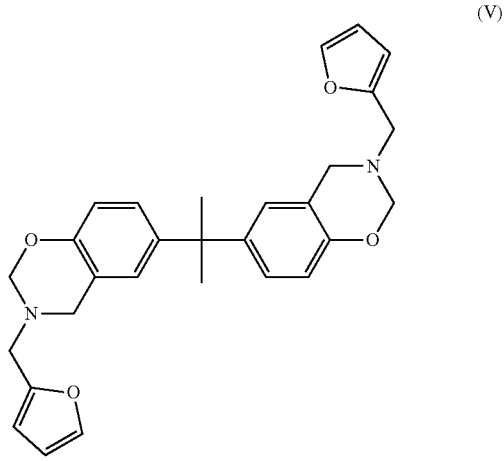 [SMILES: CC(C)(c1ccc2c(c1)CN(Cc1ccco1)CO2)c1ccc2c(c1)CN(Cc1ccco1)CO2]

(V)

Above structure V, also not in accordance with the present invention, is bisphenol A furfuryl amine, in which a bridge (i.e. dimethyl methane) is coupled also in para position of the phenyl groups.

Table 1 below shows examples of diene-based rubber compositions having different reinforcement agents, including amongst others the structures I, II, II, IV, V. Control Sample 1 is essentially reinforced by carbon black only. Control Sample 2 is reinforced by carbon black and a reactive resin system including a phenolic resin and hexamethylenetetramine. Inventive Examples 1-3 are reinforced by 3,3'-dihydroxy diphenyl disulfide-furfuryl amine (also referred to as 3DPDS fa herein) corresponding to above shown structure I. In particular, Inventive Example 1 comprises 15 phr 3DPDS fa (which corresponds to an equimolar amount to the resin content in Control Sample 2), Inventive Example 2 comprises 10 phr 3DPDS fa and Inventive Example 3 comprises 20 phr 3DPDS fa.

TABLE 1

| Material | Parts by weight (phr) | | | | |
|---|---|---|---|---|---|
| | Control Sample 1 | Control Sample 2 | Inventive Example 1 | Inventive Example 2 | Inventive Example 3 |
| Polyisoprene | 100 | 100 | 100 | 100 | 100 |
| Zinc Oxide | 5 | 5 | 5 | 5 | 5 |
| Sulfur | 5.5 | 5.5 | 5.5 | 5.5 | 5.5 |
| Stearic Acid | 2 | 2 | 2 | 2 | 2 |
| TDAE Oil | 5 | 5 | 5 | 5 | 5 |
| DCBS[1] | 3 | 3 | 3 | 3 | 3 |
| Benzoxazine 3DPDS fa[2] | 0 | 0 | 15 | 10 | 20 |
| Benzoxazine 3DPDS ea[3] | 0 | 0 | 0 | 0 | 0 |
| Benzoxazine 3DPDS a[4] | 0 | 0 | 0 | 0 | 0 |
| Benzoxazine 4DPDS fa[5] | 0 | 0 | 0 | 0 | 0 |
| Benzoxazine BA fa[6] | 0 | 0 | 0 | 0 | 0 |
| Phenolic resin[7] | 0 | 7 | 0 | 0 | 0 |
| Carbon Black | 80 | 80 | 80 | 80 | 80 |
| HMTA[8] | 0 | 1.5 | 0 | 0 | 0 |

[1]Sulfenamide Accelerator
[2]3,3'-dihydroxy diphenyl disulfide-furfuryl amine
[3]3,3'-dihydroxydiphenyl disulfide ethanol amine
[4]3,3'-dihydroxydiphenyl disulfide aniline
[5]Bis (4-hydroxyphenyl disulfide furfuryl amine)
[6]bisphenol A furfuryl amine
[7]as Phenolic Novolac (TP), DUREZ 31459, SBHPP
[8]Hexamethylenetetramine Table 2 lists further Control Samples and Inventive Samples. In particular, Control Sample 3 is reinforced with bis (4-hydroxyphenyl disulfide furfuryl amine) which is also referred to herein as 4DPDS fa. This benzoxazine corresponds to above structure IV and has both phenyl groups bridged in para positions. Control Sample 4 is reinforced by bisphenol A furfuryl amine (mentioned herein also as BA fa) which is also comprising a bridge connected at para positions of the phenyl groups (see also structure V). In contrast, Inventive Examples 4 and 5 comprise benzoxazines bridged again at meta positions of the respective phenyl groups wherein Inventive Example 4 comprises 3'-dihydroxydiphenyl disulfide ethanol amine (3DPDS ea, also shown in structure II) and Inventive Example 5 comprises 3,3'-dihydroxydiphenyl disulfide ethanol aniline (3DPDS, as shown in structure III).

TABLE 2

| Material | Parts by weight (phr) | | | |
|---|---|---|---|---|
| | Control Sample 3 | Control Sample 4 | Inventive Example 4 | Inventive Example 5 |
| Polyisoprene | 100 | 100 | 100 | 100 |
| Zinc Oxide | 5 | 5 | 5 | 5 |

TABLE 2-continued

| | Parts by weight (phr) | | | |
|---|---|---|---|---|
| Material | Control Sample 3 | Control Sample 4 | Inventive Example 4 | Inventive Example 5 |
| Sulfur | 5.5 | 5.5 | 5.5 | 5.5 |
| Stearic Acid | 2 | 2 | 2 | 2 |
| TDAE Oil | 5 | 5 | 5 | 5 |
| DCBS[1] | 3 | 3 | 3 | 3 |
| Benzoxazine 3DPDS fa[2] | 0 | 0 | 0 | 0 |
| Benzoxazine 3DPDS ea[3] | 0 | 0 | 15 | 0 |
| Benzoxazine 3DPDS a[4] | 0 | 0 | 0 | 15 |
| Benzoxazine 4DPDS fa[5] | 15 | 0 | 0 | 0 |
| Benzoxazine BA fa[6] | 0 | 15 | 0 | 0 |
| Phenolic resin[7] | 0 | 0 | 0 | 0 |
| Carbon Black | 80 | 80 | 80 | 80 |
| HMTA[8] | 0 | 0 | 0 | 0 |

[1]Sulfenamide Accelerator
[2]3,3'-dihydroxy diphenyl disulfide-furfuryl amine
[3]3,3'-dihydroxydiphenyl disulfide ethanol amine
[4]3,3'-dihydroxydiphenyl disulfide aniline
[5]Bis (4-hydroxyphenyl disulfide furfuryl amine)
[6]bisphenol A furfuryl amine
[7]as Phenolic Novolac (TP), DUREZ 31459, SBHPP
[8]Hexamethylenetetramine Table 3 shows measurements of the Young Modulus E, which is an indicator for the stiffness, for Controls Samples 1 to 4 and Inventive Examples 1 to 5 corresponding to the above Tables 1 and 2. Control Sample 1 having only a carbon black reinforcement has the lowest stiffness. Control Samples 3 and 4 reinforced with benzoxazines having phenyl groups coupled in para position show higher stiffness than control sample 1 but lower stiffness than (equimolar) reactive resin reinforced Control Sample 2. As further shown in Table 3, Inventive Examples 1 to 5 have each a higher stiffness than any Control Samples and are, for instance, considered as a valuable replacement for the reactive resin system of Control Sample 2. Young Modulus as shown in Table 3 was determined according to DIN 53504 on an INSTRON 5967 electro-mechanical testing machine using type S2 dumbbell specimens with 75 mm length. Young Modulus was determined up to 1.5% strain.

TABLE 3

| | Control Samples 1 to 4 | | | | Inventive Examples 1 to 5 | | | | |
|---|---|---|---|---|---|---|---|---|---|
| Property | 1 | 2 | 3 | 4 | 1 | 2 | 3 | 4 | 5 |
| Young Modulus E [MPa] | 0.3 | 0.6 | 0.5 | 0.5 | 0.8 | 0.7 | 1.0 | 0.8 | 1.0 |

While certain representative embodiments and details have been shown for the purpose of illustrating the subject invention, it will be apparent to those skilled in this art that various changes and modifications can be made therein without departing from the scope of the subject invention.

What is claimed is:

1. A rubber composition comprising: 100 phr of one or more diene-based elastomers; 30 phr to 200 phr of a filler; and a benzoxazine selected from the group consisting of 3,3'-dihydroxy diphenyl disulfide-furfuryl amine, 3,3'-dihydroxydiphenyl disulfide ethanol amine, and 3,3'-dihydroxydiphenyl disulfide aniline.

2. The rubber composition of claim 1 wherein the rubber composition comprises 25 phr to 40 phr of the benzoxazine.

3. A rubber composition comprising: 100 phr of one or more diene-based elastomers; 30 phr to 200 phr of a filler; and a benzoxazine, wherein the benzoxazine has at least one of the following structures:

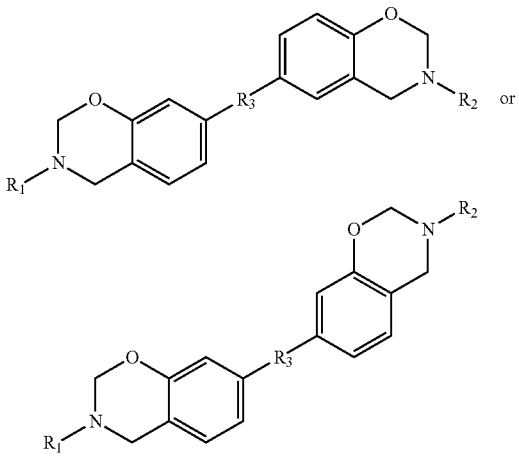

wherein $R_1$ and $R_2$ are selected from aromatic groups, aliphatic groups, and cycloaliphatic groups and wherein $R_3$ is a monosulfide, or a disulfide.

4. The rubber composition of claim 3 wherein $R_1$ and $R_2$ are selected from the group consisting of allyl groups, methyl groups, ethyl groups, normal-propyl groups, isopropyl groups, hexyl groups, cyclohexyl groups, fluorine groups, phenyl acetylene groups, propargyl ether benzyl groups, benzonitrile groups, furfuryl groups, and benzyl groups.

5. The rubber composition of claim 3 wherein the rubber composition comprises 25 phr to 40 phr of the benzoxazine.

6. The rubber composition of claim 3 wherein $R_1$ and $R_2$ represent aromatic groups.

7. The rubber composition of claim 3 wherein $R_1$ and $R_2$ represent, aliphatic groups.

8. The rubber composition of claim 3 wherein $R_1$ and $R_2$ represent cycloaliphatic groups.

9. A rubber product comprising the rubber composition of claim 3.

10. The rubber product of claim 9, wherein the rubber product is selected from the group consisting of tires, power transmission belts, hoses, tracks, air sleeves, and conveyor belts.

11. The rubber product of claim 9 wherein the rubber product is a tire, comprising one or more rubber components selected from a tread, a shearband, rubber spokes, an undertread, a sidewall, an apex, a flipper, a chipper, a chafer, a carcass, a belt, an overlay, wherein one or more of the rubber components comprise the rubber composition.

* * * * *